United States Patent [19]

Erwin

[11] Patent Number: 4,485,840
[45] Date of Patent: Dec. 4, 1984

[54] FLUSHING SYSTEM FOR A METER-MIX-DISPENSING DEVICE

[75] Inventor: Wayne F. Erwin, Hilliard, Ohio
[73] Assignee: Ashland Oil, Inc., Ashland, Ky.
[21] Appl. No.: 373,872
[22] Filed: May 3, 1982
[51] Int. Cl.³ .......................... B08B 7/04; B05B 15/02
[52] U.S. Cl. .................................... 137/240; 134/102; 222/135; 222/148; 239/112; 239/304
[58] Field of Search ................ 134/95, 99, 100, 101, 134/102; 137/240; 222/135, 148; 239/112, 304

[56] References Cited

U.S. PATENT DOCUMENTS

| | | | |
|---|---|---|---|
| 3,178,118 | 4/1965 | New | 239/304 |
| 3,348,774 | 10/1967 | Wiggins | 239/112 |
| 3,462,081 | 8/1969 | Gelin et al. | 239/112 |
| 3,541,023 | 11/1970 | Cole | 239/112 |
| 3,769,232 | 10/1973 | Houldridge | 239/112 |
| 3,790,030 | 2/1974 | Ives | 239/112 |
| 3,940,063 | 2/1976 | Baumgartner et al. | 239/112 |
| 4,073,664 | 2/1978 | Zwirlein | 239/112 |
| 4,204,977 | 3/1980 | Zwirlein | 239/112 |
| 4,285,446 | 8/1981 | Rapp et al. | 239/112 |

Primary Examiner—George L. Walton
Attorney, Agent, or Firm—Wood, Herron & Evans

[57] ABSTRACT

A flushing system and method associated with a meter-mix-dispensing device for the production of two-component adhesive systems containing isocyanate is provided in which water and/or a solvent, and pressurized air are sequentially introduced into the device for cleaning.

20 Claims, 3 Drawing Figures

FLUSHING SYSTEM FOR A METER-MIX-DISPENSING DEVICE

FIELD OF THE INVENTION

This invention relates to a system for metering and mixing at least two constituent materials to form an adhesive material for application to a surface and, more particularly, to a flushing system associated with such a system to provide complete removal of the adhesive material from the system elements and thus assure reliable metering and mixing of the constituent materials.

BACKGROUND OF THE INVENTION

A wide variety of manufacturing processes and applications, such as assembly lines, require the constant availability of adhesive material for dispensing at periodic intervals in the operation. Where relatively large quantities of adhesive are required on a constant basis in a particular application, it has been found that manual preparation of the adhesive material is inefficient, uneconomical and susceptible to human error, particularly in the metering phase. In an effort to overcome such problems, automatic meter-mix-dispensing systems have been developed for the automatic metering and mixing of two or more components in predetermined ratios to form an adhesive material having the desired characteristics. These systems may be placed in close proximity to an assembly line or other location where the adhesive is to be applied for ease of application.

Conventional meter-mix-dispensing systems typically include delivery lines for each constituent material which have some form of metering mechanism to control the proportion of materials to be mixed. The delivery lines connect to a manifold or mixing chamber in which the constituent materials are at least preliminarily mixed together. In most designs, a one-way valve such as a ball check valve is disposed in each delivery line adjacent the manifold to prevent flow of one material into the delivery lines of other materials. Once premixed in the manifold, the materials are then diverted into an active or static mixer for complete mixing prior to release into a suitable dispensing device.

Meter-mix-dispensing systems of this general design also include a flushing system for removing individual materials and/or mixed adhesive from the manifold, mixer, outlet lines and dispensing device after the system is shut down for a certain time period. In producing solvent-based adhesives, a cleaning solution capable of removing such adhesives is introduced into the manifold and flows outwardly through the system elements to the dispensing device. It has been found that conventional meter-mix-dispensing systems having standard flushing systems using cleaning solutions capable of removing adhesive components, provide satisfactory results in the production of many two-component adhesives.

A great deal of research and development has been conducted in the field of solvent-less or water borne adhesives as replacements for solvent-based adhesives, and several products have been developed which are more desirable for a variety of reasons. In particular, there has been an increasingly growing shift to the use of what may be generically referred to as water-based adhesives from adhesives such as catalyzed polyvinyl acetate, phenol resorcinol and other solvent-based adhesives. Among the reasons for this shift from solvent-based adhesives is the greater flexibility in operating temperatures provided by water-based adhesives, better appearance at the glue line, faster production rates and minimization or elimination of emissions such as vaporous solvents and formaldehyde.

One preferred water-based adhesive system comprises an aqueous polymer dispersion forming a base emulsion and a polymeric isocyanate which acts as a cross-linking agent or hardener when mixed with the base emulsion. This adhesive material will be referred to herein as an emulsion polymer/isocyanate or EPI material.

While EPI material has been shown to provide many of the advantages common to other water-based adhesives, it was found that blockage, clogging and other problems occurred in conventional meter-mix-dispensing systems used to prepare EPI materials. Inspection of the elements of such systems revealed that solid deposits form on the valves, delivery lines and other elements after only a relatively short period of time. The problem was traced to the check valves in each delivery line and the properties of the materials used to form EPI material.

Prior to this invention, the primary modification to the flushing systems of such meter-mix-dispensing devices to accommodate the production of water-based adhesives, was the substitution of water for cleaning solution since such adhesives are water soluble or water dispersible. However, the problem with the check valves and subsequent clogging of the entire system with solid deposits remained.

As is well known, a polyisocyanate reacts with water to form a polyurea. In addition, other components of the base emulsion are capable of reacting with polyisocyanate to form other solid deposits derived from polyisocyanate. Experiments indicated that after a period of normal use of a conventional meter-mix-dispensing system, water in the base emulsion and from the flushing operation as well as other components of the base emulsion react with the polyisocyanate of the crosslinker to initially form solid deposits on the check valve of the isocyanate delivery line adjacent the manifold. Eventually, such deposits become large enough to impair the ability of the valve to properly seat. Water introduced into the manifold during the flushing operation is then allowed to flow upstream into the isocyanate delivery line where it reacts with the isocyanate to form solid deposits in the delivery line, metering device and other elements of that portion of the system. These deposits act to clog or block the isocyanate delivery line and restrict the flow of isocyanate into the mixing chamber. Although some variance may be permitted in the ratio of base emulsion-to-isocyanate without compromising the desired properties of the EPI material, significant obstruction of the isocyanate delivery line and/or metering device results in the production of an adhesive having greatly reduced bonding capability. None of the flushing systems known to the inventors are capable of removing or initially preventing the deposition of such solid deposits on the check valve disposed along the isocyanate delivery line.

It has therefore been an object of this invention to provide an improved flushing system for a meter-mix-dispensing device in the production of EPI materials.

It is another object herein to provide a flushing system for a meter-mix-dispensing device in which the formation of solid deposits is prevented before valves associated with the delivery lines of the isocyanate become restricted or inoperable.

It is a further object of the invention to provide a method for eliminating the formation of solid deposits derived from polyisocyanate in a meter-mix-dispensing device.

SUMMARY OF THE INVENTION

The flushing system and method which accomplishes these objectives include a water line connected to a pressurized source of preferably warm water at one end and to the manifold of the meter-mix-dispensing device at the other end. The warm water, which may include additives such as acids, bases and/or detergents, washes away the majority of mixed or unmixed adhesive from the manifold, mixing means and dispensing mechanism of the meter-mix-dispensing device. Depending on the type of materials used to form a two-component adhesive, the water line may be replaced with a solvent line as discussed in detail below. A separate line, containing air under pressure, is connected to the manifold. The air line may be operated to deliver pressurized air into the manifold, mixing means and dispensing mechanism in short bursts as the warm water or solvent flows therethrough to provide additional agitation for a better cleaning action. In addition, or alternatively, the air line may be operated to introduce air into such elements of the meter-mix-dispensing device after the water or solvent flush cycle is completed to at least partially remove any remaining water therefrom.

The flushing system also includes a cleaning line connected upstream of the check valve in the isocyanate delivery line, which, as mentioned above, introduces the isocyanate cross-linker into the manifold. A solvent preferably capable of dissolving isocyanate flows through the cleaning line into the isocyanate delivery line, and acts to prevent the formation of solid deposits derived from the isocyanate, particularly on the check valve in the isocyanate delivery line.

As discussed in more detail below, it is essential for the accurate metering and mixing of the isocyanate to eliminate all deposits which may impair the ball check valve in the isocyanate line from fully opening and closing. By cleaning the ball check valve in such line with each flushing operation, proper operation of the meter-mix system is assured.

Briefly, the method of flushing a meter-mix system for the production of water-based adhesives includes the steps of:

(1) initially flushing the manifold, mixing means and dispensing mechanism of the meter-mix device with preferably warm water or solvent;

(2) introducing air under pressure to remove the water from the path identified above; and (3) introducing solvent into the isocyanate delivery line upstream from the manifold, allowing the solvent to flow over the ball check valve in the isocyanate line and into the mix manifold, static mixer and dispenser means for removing any solid deposits and mixed adhesive.

DETAILED DESCRIPTION OF THE DRAWINGS

The structure, operation and advantages of this invention will become apparent upon consideration of the following discussion taken in conjunction with the accompanying drawings wherein.

DETAILED DESCRIPTION OF THE INVENTION

Figure 1:
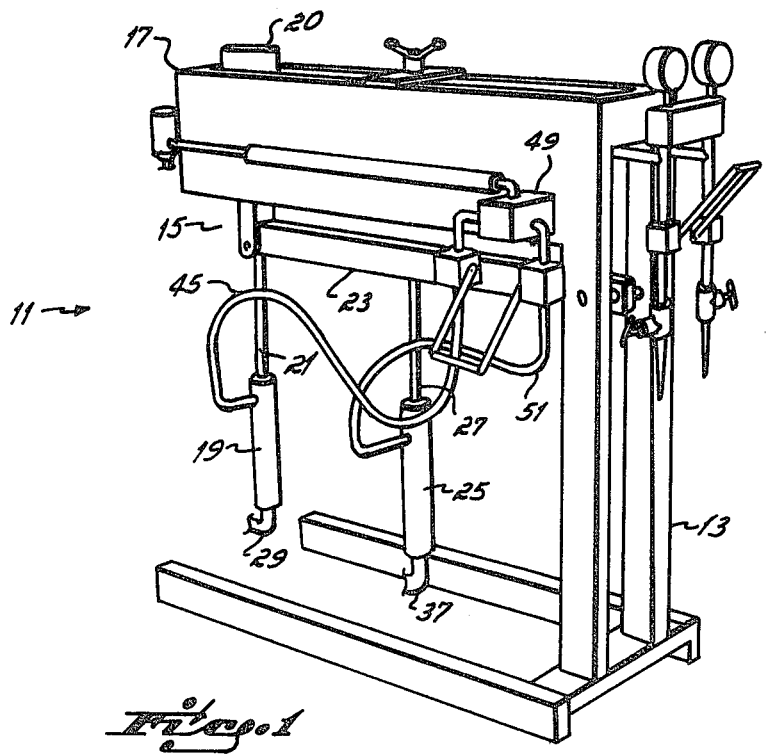
FIG. 1 is a perspective view of a meter-mix-dispensing system including the flushing system of this invention.

Referring now to the drawings, a meter-mix-dispensing device is labeled generally with the reference numeral 11. The system 11 may be obtained commercially and thus only those aspects of the system 11 pertinent to the operation of the flushing system of this invention will be discussed. It should be understood that other two-component adhesive mixing devices could be utilized with the invention herein, and the device 11 is shown for purposes of illustration.

The system 11 includes a mounting stand 13 having a lower cross-brace 15 and a top cross-brace 17. Mounted to the lower cross-brace 15 is a meter cylinder 19 having a piston rod 21 extending outwardly therefrom which is connected to and reciprocated by a pneumatic cylinder 20 mounted on the top cross-brace 17. A lever arm 23 is attached to piston rod 21 at one end and pivotally connected at its other end to the mounting stand 13. A second meter cylinder 25 is mounted to the lower cross-brace 15 between the first meter cylinder 19 and stand 13, and includes a piston rod 27 which extends upwardly into engagement with the lever arm 23. In response to reciprocation of the pneumatic cylinder 20, the piston rods 21 and 27 of the meter cylinders 19 and 25, respectively, move upwardly and downwardly. Since piston rod 21 is further away from the mounting stand 13 where the lever arm 23 pivots, the length of stroke of the piston rod 21 of the first meter cylinder 19 is greater than that of the piston rod 27 of the second meter cylinder 25.

The first meter cylinder 19 is connected to a delivery line 29 which extends into a drum 31 containing one of the two constituent materials used to make an adhesive material. The material in drum 31 will be designated as material A for purposes of this discussion. A drum 39, containing the second constituent material, herein designated as material B, is connected by a delivery line 37 to the second meter cylinder 25. As shown in the drawings, material A is pumped from drum 31 into first meter cylinder 19 by a pump 33 in combination with an air valve 35 and material B is pumped from drum 39 through second meter cylinder 25 by a pump 41 and air valve 43.

For purposes of illustrating the flushing system of this invention, two types of adhesive materials will be discussed. The first adhesive material, as mentioned above, is a combination of a water dispersion polymer designated as material A and an isocyanate cross-linker forming material B. In the alternative, material A could be a phenolic polyol-solvent or a phenolic polyol-reactive diluent combination and material B could be a polyisocyanate. It should be noted that each combination of materials A and B forms an adhesive which contains isocyanate in some form. As discussed in detail below, the flushing system of this invention operates to remove isocyanate and mixed adhesives.

A first delivery or inlet line 45, having a one-way valve 47 disposed therealong, extends from the meter cylinder 19 to a manifold 49. Similarly, a second delivery or inlet line 51, also having a one-way valve 53, extends from the second meter cylinder 25 to the opposite side of manifold 49. The one-way valves 47 and 53 are preferably ball check valves or a functional equivalent. The first and second inlet lines 45 and 51 introduce materials A and B, respectively, into the manifold 49 where they are agitated and preliminarily mixed together to form an adhesive. The partially mixed materials A and B exit the manifold 49 through an outlet line 55 and flow into a static mixer 57 having internal baffles 59 for completely mixing materials A and B. Upon exiting the static mixer 57, the adhesive material enters a dispensing line 59 and then flows to a dispensing gun 61 or similar mechanism.

In the particular adhesive materials formulated with apparatus 11, using either combination of materials A and B mentioned above, the ratio of such materials must be maintained during the mixing process to assure that the adhesive produced possesses the desired bonding capability and other properties. Although in some cases a small percentage error can be tolerated in the relative volumes of materials A and B which are mixed together, relatively exact metering of the constituent materials is usually necessary and desired. Although not discussed in detail herein, the system 11 includes an adjustment means 63 which is operable to vary the location of the second meter cylinder 25 along lever arm 23 which in turn varies the proportion of material B introduced into the manifold 49. Regardless of the relative proportions of materials A and B, it is an important feature of this invention to assure that once such proportions are determined they are maintained indefinitely.

Figure 3:
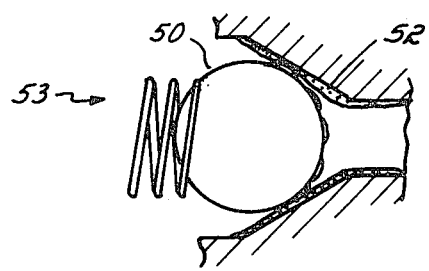
FIG. 3 is a partial cross-sectional view of a ball check valve used in the isocyanate delivery line of the system herein.

As mentioned above, it is well known that polyisocyanate reacts with water to form a polyurea, and other elements of the base emulsion can react with polyisocyanate to form solid deposits. In addition, the major components of the phenolic polyol-solvent and phenolic polyol-reactive diluent combinations can react with polyisocyanate to form solid deposits. Both of the B constituent materials contain a polyisocyanate. It has become apparent that a major limitation of the utility of meter-mix-dispensing devices such as device 11 in the processing of adhesives containing isocyanates is the inability of the flushing system associated with such devices to prevent the formation of solid deposits derived from isocyanate in the isocyanate delivery line. Such deposits appear to begin forming on the check valve first, as material A and/or the water introduced into the manifold 49 during a flushing operation reacts with the isocyanate in material B and then proceeds to other portions of the isocyanate line. The presence of water is inherent in the base emulsion forming material A in the first adhesive discussed above. In the second type of adhesive using a phenolic polyol as a component of material A, it is believed that moisture from the air could be absorbed by the phenolic polyol and present problems when mixed with the isocyanate of material B in addition to the solid deposits formed directly by reaction of the major components of material A with the isocyanate. Assuming the one-way valves 47 and 53 of device 11 are ball check valves as shown in FIG. 3, the solid deposits have been observed on the spring-biased ball 50 and seat 52 of the valve 53. In a relatively short period of time, the ball 50 cannot properly engage seat 52 due to buildup of the solid deposits. Further deposit formation occurs tending to restrict the inlet line 51 and impair the operation of the second meter cylinder 25 upstream along the second inlet line 51, particularly as a result of water entering this flow path during the water flushing operation of the water-based adhesive.

If allowed to proceed, the formation of solid deposits in the second inlet line 51 and elements of system 11 disposed therealong would result in inaccurate metering of material B and/or an improperly reduced flow rate of material B into the manifold 49. The ratio of material A to material B would then be inaccurate and the resultant adhesive mixture would undoubtedly fail to exhibit the desired bonding strength and other characteristics.

As discussed above, prior art flushing systems for use with meter-mix-dispensing devices such as device 11 do not prevent the formation of solid deposits. The flushing system of this invention overcomes this limitation by providing a unique isocyanate delivery line cleaning means in combination with other elements.

Figure 2:
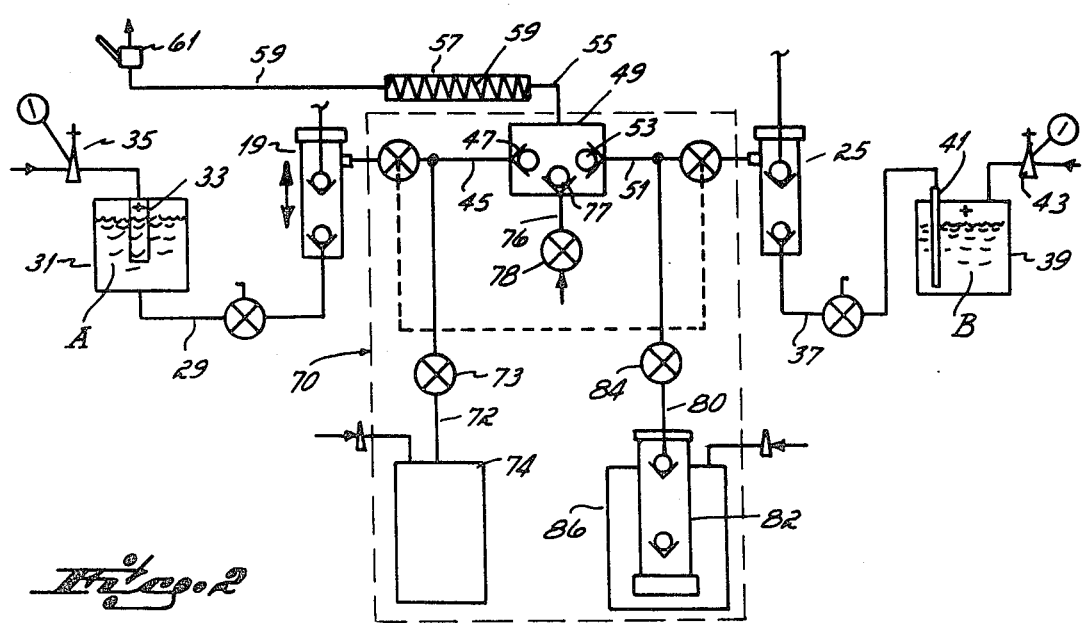
FIG. 2 is a schematic diagram of the system shown in FIG. 1.

Referring now to FIG. 2, the flushing system of this invention is outlined in phantom lines and labeled generally with the reference numeral 70. The flushing system 70 will initially be described as it is used for the removal of water-based adhesives such as the one described above which contains a water dispersion polymer or base emulsion as material A and an isocyanate cross-linker as material B. As discussed below, a slight modification may be made to the operation of system 70 to accommodate adhesives such as the one described above which contain isocyanate but are not water-based.

Generally, system 70 includes three separate delivery assemblies for the introduction of water, air and cleaning solution into the manifold 49 in discrete cycles. Considering first the water delivery assembly, a water line 72 having a valve 73 disposed therealong is connected at one end to the first inlet line 45 downstream from the first meter cylinder 19, and at the other end to a vessel 74. The vessel 74 is in turn connected to an air line which pressurizes the vessel 74 to force the water it contains through line 72.

The water, preferably warm or hot, is introduced through first inlet line 45 and ball check valve 47 into the manifold 49 for removal of any mixed or unmixed materials A and B which remain after the system 11 has been shut down for an hour or more. As mentioned above, the water may contain acids, bases, detergents or other additives to enhance the flushing action. The water exits the manifold 49 and flows in the outlet line 55, static mixer 47 and out through the dispensing gun 61. A large proportion of the materials A and B are effectively removed during this water flushing operation.

A second element of the flushing system 70 is a pressurized air line 76 connected directly to the manifold 49 through a one-way valve 77. In some instances, particularly where the water temperature is relatively cool, short bursts of air may be introduced into the manifold 49 by opening and closing valve 78 during the water flushing cycle. These air bursts help to agitate the water within the manifold 49 and the remainder of system 11 to improve the cleaning efficiency. Air bursts may not be necessary if very hot water is used during the water flushing cycle. When the water flushing cycle has been completed, air is introduced into the manifold 49, outlet line 55, static mixer 57 and out through the dispensing gun 61 continuously for a period sufficient to dry these elements or at least remove most of the remaining water.

The third element of the flushing system 70 is a cleaning fluid line 80 which is connected to the second inlet line 51 at one end upstream from the ball check valve 53, and at the other end to a pump 82 disposed in a drum 86. As mentioned above, the drum 86 contains a solvent material preferably capable of dissolving isocyanate and one which is preferably non-toxic. The solvent is released into second inlet line 51 by opening a valve 84 in line 80 and contacts the ball check valve 53 disposed therealong adjacent manifold 49. As discussed above, the primary cause of solid deposits derived from polyisocyanate in second inlet line 51 and second metering cylinder 25 in systems 11 without flushing system 80 is the initial build up of solid deposits on the ball check valve 53. Such deposits prevent the ball check valve from properly opening and closing which in turn results in further deposits upstream from valve 53.

It has been found that by introducing a solvent preferably capable of dissolving isocyanate at a location upstream from ball check valve 53, substantially all of the isocyanate on such valve 53 is removed during every flushing operation before solid deposits are formed. This effectively prevents or at least severely limits the initial formation of solid deposits and/or adhesive on valve 53 and allows it to close properly at all times. Thus, further deposits are prevented upstream of valve 53.

Accordingly, the flushing or cleaning method of this invention for water-based adhesives such as described above is accomplished as follows. Once system 11 is shut down for an extended period, a flushing operation must be conducted before new adhesive can be made. Initially, valve 73 is opened allowing heated water from vessel 74 to flow through water line 72 and first inlet line 45 into the manifold 49. Most of the mixed material A and B is removed from the manifold 49, outlet line 55, static mixer 57 and dispensing gun 61 by the heated water. If desired, and particularly where relatively cool water is used, bursts of air may be introduced into the manifold 49 during the water flushing cycle to agitate the water and aid in the cleaning operation.

After a short period of time, typically five minutes or less, valve 73 is closed to stop the flow of water. Valve 78 is then opened and a continuous stream of air is introduced through air line 76 into the manifold 49 and outwardly to the dispensing gun 61 to dry as much as possible the system elements. Valve 78 is then closed.

Finally, valve 80 is opened to allow solvent from drum 86 to be pumped into the second inlet line 51 upstream from ball check valve 53. The solvent contacts the ball check valve 53 and effectively removes any coating of isocyanate or mixed adhesive thereon. Although not shown in the drawings, the dispensing gun 61 may be placed into the drum 86 during the solvent flush operation after a small amount of solvent first passes from the manifold 49 to the dispensing gun 61, so that the solvent is not wasted.

The operation of system 70 may be modified to accommodate adhesive materials which are not water based but which contain isocyanate. The adhesive described above which contains a phenolic polyol-solvent or phenolic polyol-reactive diluent combination as material A and polyisocyanate as material B is one example of such adhesive. For this type of adhesive which is not water borne, tank 74 may be filled with a solvent instead of water which solvent is introduced into the manifold through line 72 for the initial cleaning of manifold 49 and to remove any material A remaining in line 45 and/or on ball check valve 47. The valve 73 is then closed and the flushing operation continues with the introduction of a solvent into the second inlet line 51 through the cleaning fluid line 80. The solvent flows over the ball check valve 53 in the second inlet line 51, into the manifold 49 and then outwardly through the remainder of system 11 removing materials A, B and the mixture thereof from the elements of the system 11. Short bursts of air may be introduced during the solvent flushing operation through line 72 and/or line 80 by air line 76 as an aid to the cleaning operation. The valve 84 in the solvent line 80 is then closed and the air line valve 78 closed to complete the flushing operation. Removal of any mixed adhesive or isocyanate from the ball check valve 53 is provided with this flushing operation, thus assuring proper operation of the meter-mix-dispensing system 11.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A flushing system adapted to be connected with a mixing device, said mixing device having a mixing means, a first inlet line for conveying a first material to said mixing means and a second inlet line for conveying a second material to said mixing means for combination with said first material to form a mixed material, said first inlet line having a one-way valve disposed therealong, said flushing system including a cleaning fluid line communicating with said mixing means through said second inlet line, said cleaning fluid line conveying cleaning fluid into said mixing means for removing said first and second materials and said mixed material therefrom, and a solvent line connected to said first inlet line upstream of said one-way valve, said solvent line conveying a solvent material through said first inlet line, over said one-way valve and into said mixing means to clean said one-way valve from said first material and said mixed material.

2. The flushing system of claim 1 wherein said first material contains polyisocyanate.

3. The flushing system of claim 1 wherein said cleaning fluid is water and said second material contains an aqueous polymer dispersion.

4. The flushing system of claim 1 wherein said second material contains an aqueous polymer dispersion and said cleaning fluid is water having at least one additive chosen from the group of acids, bases and detergents.

5. The flushing system of claim 1 wherein said cleaning fluid is a solvent material and said second material contains a phenolic polyol-solvent combination.

6. The flushing system of claim 1 wherein said cleaning fluid is a solvent material and said second material contains a phenolic polyol-reactive diluent combination.

7. A flushing system adapted to be connected with a mixing device, said mixing device including a mixing means, a first inlet line for conveying an isocyanate material to said mixing means, and a second inlet line for conveying a base emulsion material to said mixing means for combination with said isocyanate material to form an adhesive material, each of said first and second inlet lines having a one-way valve disposed therealong, said flushing system including a water line communicating with said mixing means through said second inlet line, said water line conveying water into said mixing means for removing said isocyanate, base emulsion and adhesive material therefrom, and a solvent line connected to said first inlet line upstream relative to said one-way valve disposed therealong, said solvent line conveying solvent into said first inlet line, over said one-way valve therein and to said mixing means for removing said isocyanate material and adhesive material from said one-way valve and said mixing means.

8. The flushing system of claim 7 further including an air line communicating with said mixing means, said air line introducing pressurized bursts of air into said mixing means with said water to aid removal of said materials therefrom.

9. The flushing system of claim 7 further including an air line communicating with said mixing means, said air line introducing pressurized air into said mixing means to remove said water therefrom prior to introduction of said solvent into said mixing means.

10. The flushing system of claim 7 wherein said water contains at least one additive chosen from the group of acids, bases and detergents.

11. A flushing system adapted to be connected with a mixing device, said mixing device including a mixing means, a first inlet line for conveying an isocyanate material to said mixing means, and a second inlet line for conveying a base emulsion material to said mixing means for combination with said isocyanate material to form an adhesive material, each of said first and second inlet lines having a one-way valve disposed therealong, said flushing system including a water line communicating with said mixing means through said second inlet line, said water line conveying water into said mixing means for removing said isocyanate, base emulsion and adhesive material therefrom, an air line communicating with said mixing means, said air line conveying air under pressure into said mixing means for aiding the removal of said isocyanate, base emulsion and adhesive material therefrom, and a solvent line connected to said first inlet line upstream relative to said one-way valve disposed therealong, said solvent line conveying solvent into said first inlet line, over said one-way valve therein and to said mixing means for removing said isocyanate material and adhesive material from said one-way valve and said mixing means.

12. In a meter-mix-dispensing device for automatically metering a first material and a second material in a predetermined ratio and mixing said first and second materials together to form a mixed material for dispensing, said device including separate metering means for each material, manifold means for preliminary mixing of said materials, first and second inlet lines for conveying said first and second materials respectively, said first and second inlet lines connecting respective ones of said metering means to said manifold means and having a one-way valve disposed therealong, a static mixing means for completely mixing said materials together to form said mixed material, an outlet line connecting said manifold means to one end of said static mixing means, and dispensing means communicating with the other end of said static mixing means, the improvement comprising:

a flushing system for removing said materials and said mixed material from said manifold means, outlet line, static mixing means, and dispensing means, said flushing system including a cleaning fluid line connected to said second inlet line and communicating with said manifold means, said cleaning fluid line introducing cleaning fluid into said second inlet line, manifold means, outlet line, static mixing means and dispensing means for removing said materials and said mixed material therefrom, and a solvent line connected to said first inlet line upstream relative to said one-way valve disposed therealong, said solvent line conveying solvent fluid through said first inlet line, over said one-way valve disposed therealong and through said manifold means, outlet line, static mixing means and dispensing means, said solvent fluid removing said first material and mixed material from said one-way valve and said mixing means.

13. The flushing system of claim 12 wherein said first material contains polyisocyanate.

14. The flushing system of claim 12 wherein said cleaning fluid is water and said second material contains an aqueous polymer dispersion.

15. The flushing system of claim 12 wherein said second material contains an aqueous polymer dispersion and said cleaning fluid is water having at least one additive chosen from the group of acids, bases and detergents.

16. The flushing system of claim 12 wherein said cleaning fluid is a solvent material and said second material contains a phenolic polyol-solvent combination.

17. The flushing system of claim 12 wherein said cleaning fluid is a solvent material and said second material contains a phenolic polyol-reactive diluent combination.

18. In a meter-mix-dispensing device for automatically metering a first material and a second material in a predetermined ratio and mixing said first and second materials together to form a mixed material for dispensing, said device including separate metering means for each material, manifold means for preliminary mixing of said materials, first and second inlet line for conveying said first and second materials respectively, said first and second inlet lines connecting respective ones of said metering means to said manifold means and having a one-way valve disposed therealong, a static mixing means for completely mixing said materials together to form said mixed material, an outlet line connecting said manifold means to one end of said static mixing means, and dispensing means communicating with the other end of said static mixing means, the improvement comprising:

a flushing system for removing said materials and said mixed material from said first and second inlet lines, manifold means, outlet line, static mixing means, and dispensing means said flushing system including a cleaning fluid line connected to said second inlet line and communicating with said manifold means, said cleaning fluid introducing cleaning fluid into said second inlet line, manifold means, outlet line, static mixing means and dispensing means for removing said materials and said mixed material therefrom, an air line communicating with said manifold means, said air line conveying air under pressure into said mixing means for aiding in the removal of said materials and said mixed material, and a solvent line connected to said first inlet line upstream relative to said one-way valve disposed therealong, said solvent line conveying solvent fluid through said first inlet line, over said one-way valve disposed therealong and through said manifold means, outlet line, static mixing means and dispensing means, said solvent fluid removing said first material and mixed material from said one-way valve and said mixing means.

19. A flushing system adapted to be connected with a mixing device, said mixing device having a mixing means, a first inlet line for conveying a polyisocyanate material to said mixing means and a second inlet line for conveying a phenolic polyol-solvent combination material to said mixing means for combination with said polyisocyanate material to form a mixed material, each of said inlet lines having a one-way valve disposed therealong, said flushing system including a first solvent line connected to said first inlet line upstream of said one-way valve and to a container of first solvent, said first solvent line conveying said first solvent through said one inlet line, over said one-way valve and into said mixing means for removing said polyisocyanate material and said mixed material from said one-way valve and said mixing means, and a second solvent line connected to said second inlet line for conveying a second solvent through said second inlet line and into said mixing means for removing said phenolic polyol-solvent combination material and said mixed material therefrom.

20. A flushing system adapted to be connected with a mixing device, said mixing device having a mixing means, a first inlet line for conveying a polyisocyanate material to said mixing means and a second inlet line for conveying a phenolic polyol-reactive diluent material to said mixing means for combination with said polyisocyanate material to form a mixed material, each of said inlet lines having a one-way valve disposed therealong, said flushing system including a first solvent line connected to said first inlet line upstream of said one-way valve and to a container of first solvent, said first solvent line conveying said first solvent through said one inlet line, over said one-way valve and into said mixing means for removing said polyisocyanate material and said mixed material from said one-way valve and said mixing means, and a second solvent line connected to said second inlet line for conveying a second solvent through said second inlet line and into said mixing means for removing said phenolic polyol-reactive diluent material and said mixed material therefrom.

* * * * *